US007663585B2

(12) United States Patent
Ichikawa et al.

(10) Patent No.: US 7,663,585 B2
(45) Date of Patent: Feb. 16, 2010

(54) TELEVISION APPARATUS HAVING LIQUID CRYSTAL DISPLAY

(75) Inventors: Katsumi Ichikawa, Osaka (JP);
Kazuhiko Yamamoto, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 799 days.

(21) Appl. No.: 11/107,876

(22) Filed: Apr. 18, 2005

(65) Prior Publication Data

US 2005/0259066 A1 Nov. 24, 2005

Related U.S. Application Data

(60) Provisional application No. 60/571,933, filed on May 18, 2004.

(51) Int. Cl.
*G09G 3/36* (2006.01)
(52) U.S. Cl. .......................................... 345/88; 345/87
(58) Field of Classification Search ......... 349/107–109; 345/30–111, 589
See application file for complete search history.

(56) References Cited

U.S. PATENT DOCUMENTS

| | | | |
|---|---|---|---|
| 6,268,867 B1 | 7/2001 | Sato et al. | |
| 6,674,464 B1 * | 1/2004 | Mizutani et al. | ......... 348/222.1 |
| 7,071,955 B2 * | 7/2006 | Miyachi et al. | ............. 345/690 |
| 2005/0195136 A1 * | 9/2005 | Liang | ........................... 345/72 |
| 2005/0259066 A1 * | 11/2005 | Ichikawa et al. | ............ 345/102 |

FOREIGN PATENT DOCUMENTS

| | | |
|---|---|---|
| JP | 11-248931 A | 9/1999 |
| JP | 3344016 B | 8/2002 |
| JP | 3354158 B | 9/2002 |
| JP | 2002-323698 A | 11/2002 |
| JP | 2003-005175 A | 1/2003 |
| JP | 2003-52050 | 2/2003 |

\* cited by examiner

*Primary Examiner*—Srilakshmi K Kumar
(74) *Attorney, Agent, or Firm*—Morgan, Lewis & Bockius LLP

(57) ABSTRACT

A television apparatus having a liquid crystal display includes a signal processing portion for reproducing a received video signal, a liquid crystal cell for displaying a video reproduced by the signal processing portion, backlight light sources arranged on a back surface side of the liquid crystal cell for illuminating the liquid crystal cell, drivers for driving the liquid crystal cell, and an inverter for driving the backlight light sources. A transmittance of the liquid crystal cell can be increased because low color-purity cells having a color purity in a range of 40% to 60% is used as the liquid crystal cell. Also, reduction in a color reproductivity of the video caused due to the low color purity can be avoided because a color correcting circuit is provided to the signal processing portion to execute color correcting process on the video signal.

6 Claims, 5 Drawing Sheets

TELEVISION APPARATUS HAVING LIQUID CRYSTAL DISPLAY

CROSS-REFERENCE TO RELATED APPLICATIONS

This application is entitled to the benefit of Provisional Patent Application No. 60/571,933, filed on May 18, 2004.

BACKGROUND OF THE INVENTION

1. Field of the Invention

The present invention relates to a television apparatus having a liquid crystal display, and more particularly to a liquid crystal television apparatus a transmittance of liquid crystal cells of which is high and which is excellent in color reproductivity.

2. Description of the Related Art

In recent years, a television apparatus using an LCD (Liquid Crystal Display) as a display is spreading. The television apparatus having the liquid crystal display (hereinafter referred to as "liquid crystal television apparatus") has such an advantage that the apparatus is thin in thickness, light in weight, and small in power consumption rather than the television apparatus using a conventional CRT (Cathode Ray Tube). Also, normally a backlight light source is built in the liquid crystal television apparatus, and a color video is displayed on a screen of liquid crystal cells by irradiating a light emitted from the light source to the liquid crystal cells provided in the front via a diffusing plate, a prism sheet, etc., to pass through a color filter provided to the cell.

FIG. 5 is an exploded perspective view of a display unit in a conventional liquid crystal television apparatus. Here, 1 is a rear frame that is formed of a metal plate. A wiring substrate (not shown) on which a signal processing IC is mounted is provided to the backside of the rear frame 1. Then, 2 is a reflecting sheet mounted on the rear frame 1 and is formed of a white synthetic resin plate. The reflecting sheet 2 acts to reflect lights emitted from backlight light sources 53 to 55 described later. Then, 3 is a reflection frame that is constructed by a metal or synthetic resin frame member, and its inner surface is coated in white to reflect the lights emitted from the backlight light sources. Then, 4 is a rubber spacer that serves as a buffer material when it is interposed between an upper edge of the reflection frame 3 and a liquid crystal cell 12 described later. Then, 53 to 55 are three cold cathode fluorescent tubes constituting backlight light sources, which are shaped into a U-shape respectively. Then, 63 to 65 are holders that hold the cold cathode fluorescent tubes 53 to 55 and are made of an elastic member such as silicon rubber. The holders 63 to 65 have slits 63a to 65a into which the cold cathode fluorescent tubes 53 to 55 are fitted respectively. Then, 7 is a socket into which each end portion of the cold cathode fluorescent tubes 53 to 55 is inserted. The cold cathode fluorescent tubes 53 to 55 and external circuits are electrically connected mutually via the sockets 7.

Then, 8 to 11 are optical members that guide the lights emitted from the cold cathode fluorescent tubes 53 to 55 forward (upward in FIG. 5) and are constructed by a diffusing plate 8 and a diffusing sheet 9 for diffusing the light, a prism sheet 10 for collecting the diffused lights to direct them forward, and a polarization reflecting sheet 11 for passing only the light in the particular direction out of the lights collected by the prism sheet 10 and reflecting remaining lights. Then, 12 is a liquid crystal cell that has a known structure including a pair of glass substrates, and a liquid crystal, transparent electrodes, color filters that are provided between the glass substrates. The detailed structure of the liquid crystal cell is disclosed in JP-A-2002-323698 and JP-A-2003-5175, for example. Also, the color filter is disclosed in JP-A-11-248931. Then, 13 is a front frame that is made of metal and is formed like a frame in such a manner that the front frame 13 can cover an edge portion of the liquid crystal cell 12 while leaving a portion that serves as a display screen of the liquid crystal cell 12. Then, 14 is a masking tape that is pasted onto an edge portion of the surface of the liquid crystal cell 12. The masking tape 14 prevents the lights emitted from the cold cathode fluorescent tubes 53 to 55 from leaking from peripheries of the liquid crystal cell 12.

SUMMARY OF THE INVENTION

The high color reproductivity is required for the liquid crystal television apparatus that displays the color video. For this purpose, the liquid crystal cell is required to have the color purity in excess of a predetermined level. The color purity is determined by a film thickness, material, etc., of the coloring pigment of the color filter in the liquid crystal cell. For example, when the film thickness of the pigment is increased, a color density is increased and the color purity is enhanced. When the color purity is enhanced, the color reproductivity is improved. In contrast, however, the light is hard to pass through the liquid crystal cell due to increase of the film thickness of the coloring pigment and a transmittance is lowered. Thus, such a problem exists that the screen becomes dark.

FIG. 4 is a graph showing a relationship between the color purity and the transmittance. Here, change in the transmittance with respect to the color purity in two cells, i.e., the normal TN (Twisted Nematic) type VGA (Video Graphics Array) liquid crystal cell and the XGA (Extended Graphics Array) liquid crystal cell used in the 15-inch liquid crystal television apparatus is shown. As well known, the number of pixels of the VGA liquid crystal cell is 640×480 and the number of pixels of the XGA liquid crystal cell is 1024×768. In this case, actually Y1 on the abscissa has a value in a range of 40% to 60%, Y2 has a value in a range of 50% to 70%, and Y3 has a value in a range of 60% to 80%.

Normally, the color purity of 72% or more is required for the liquid crystal television apparatus. When the color purity is set to 72%, the transmittance of the liquid crystal cell is lowered to less than 8% in the case of the VGA liquid crystal cell and also is lowered to almost 6% in the case of the XGA liquid crystal cell. Also, in the case of the liquid crystal cell whose viewing angle is expanded, the transmittance is further lowered. Meanwhile, normally 450 cd (candela) is needed as a luminance on the screen of the liquid crystal television apparatus. Therefore, when the transmittance of the VGA liquid crystal cell is assumed as 7.5%, 450/0.075=6000 cd is needed as the luminance of the backlight light source to get the above luminance. Also, when the transmittance of the XGA liquid crystal cell is assumed as 6.0%, 450/0.060=7500 cd is needed as the luminance of the backlight light source to get the above luminance.

In order to assure this luminance, as explained in FIG. 5, three U-shaped cold cathode fluorescent tubes 53 to 55 are provided to the conventional liquid crystal television apparatus. Therefore, three inverter circuits are needed to drive the cold cathode fluorescent tubes 53 to 55. As a result, power consumption is increased and also the number of parts is increased, and thus a cost is increased. Also, the prism sheet 10 and the polarization reflecting sheet 11 are provided to enhance the luminance, but an increase in cost is accelerated because the polarization reflecting sheet 11 is particularly expensive.

As described above, conventionally, the transmittance is reduced when the color purity of the liquid crystal cell is enhanced. Therefore, such reduction of the luminance of the screen is avoided by increasing the number of the backlight light source and the optical members. This constituted an immense obstacle to attain a decrease in cost of the liquid crystal television apparatus.

The reason why improvement in the color purity is intended in the above manner even at the sacrifice of the transmittance is that the circumstances described in the following are present. That is, it is normal nowadays that the liquid crystal display for the liquid crystal television apparatus is supplied commonly as the module in the form of a finished product. For this reason, in order to acquire the appraisal in the market of the liquid crystal display, the maker of the liquid crystal display must inevitably throw energy into the product development to improve the color reproductivity by enhancing the color purity even though the transmittance is slightly sacrificed. Meanwhile, the maker of the liquid crystal television apparatus cannot independently control characteristics of the liquid crystal display itself since merely such maker gets the liquid crystal display as the finished product from the market and incorporates it into the television apparatus. In other words, the color purity of the liquid crystal television apparatus itself is bound by the characteristics of the liquid crystal display that is supplied to the market, and therefore the transmittance is also placed under similar restraint.

Of course, there is the display with the low color purity used as the monitor of the notebook-sized personal computer, for example, among the liquid crystal displays. Since the transmittance of the liquid crystal cell is not so lowered in such liquid crystal display, the above-mentioned problem may be avoided. However, in this case, the color reproductivity is sacrificed because of reduction in the color purity, and thus there is a fatal defect such that the clear image cannot be obtained. In fact, in the case of the monitor of the personal computer, since normally the very high color reproductivity is not requested, there is caused no trouble in practical use even if the liquid crystal cell with the low color purity is used. However, in the case of the liquid crystal television apparatus, since the color reproductivity is strictly requested, it is impossible to employ the liquid crystal display with the low color purity for the purpose of the improvement of the transmittance only. No one thought of taking such measure.

In above JP-A-2002-323698 and JP-A-2003-5175, the technology to improve the transmittance in a transmission mode and also improve the color reproductivity in the semi-transmissive liquid crystal display is disclosed. In these documents, convex alignment groups constructed by arranging a large number of convex portions are formed on the glass substrate, then the semitransmissive film having light passing holes therein is coated thereon, then the color filters, the overcoat layer, and the transparent electrode are formed thereon, and then the transparent electrode and the alignment film are formed sequentially on the glass substrate. Then, notched portions are provided by notching resin portions of the convex alignment groups that correspond to portions of the semitransmissive film in which the light passing holes are formed. However, there is a limit to the improvement of the transmittance only by providing the notched portions to the convex alignment groups. Thus, it is difficult to attain a considerable cost-reduction effect by reducing the number of the light source and the optical member in the backlight-type liquid crystal display. Also, according to the technology set forth in these documents, complicated processes must be applied to the glass substrate in the manufacturing process of the liquid crystal cell.

Also, in JP-A-2002-323698, the color filter using the red pigment having the high optical transmittance, the excellent color reproductivity and the high color purity is disclosed. In the color filter in this document, the transmission curve of the red pigment contained in the red pixel is selected such that, in the visible wavelength range of 400 nm to 700 nm, the transmittance of 50% or more is shown in a wavelength range of 420 nm to 450 nm, the transmittance of 90% or more is shown in a wavelength range of 600 nm to 650 nm, the wavelength $\lambda$max that gives the lowest transmittance is placed in a wavelength range of 460 nm to 570 nm, and the transmittance at $\lambda$max is given as 35% or less. However, since the color filter shown therein is used in the reflective liquid crystal display to which the backlight is not provided, this document in no way provides the means to solve the above technical problem in the backlight-type liquid crystal display.

The inventors of the present invention found out from various viewpoints by what measure the transmittance of the liquid crystal cell should be improved in the backlight-type liquid crystal display, still the color reproductivity is not damaged. As a result, the inventors of the present invention conceived such a conception that daringly lowers the color purity, which is never suggested until now from a common sense in the industry of the liquid crystal television apparatus that pursues the high color purity. Then, the inventors of the present invention noticed the fact that the number of the backlight light sources and the optical members can be reduced by lowering the color purity but enhancing the transmittance and also the color reproductivity, which is equivalent to that obtained when the liquid crystal cell with the high color purity is used and which can be assured by applying the color correcting process electrically although such color reproductivity is obliged to make a sacrifice owing to reduction in the color purity. In particular, in the case where the maker of the liquid crystal television apparatus manufactures independently the liquid crystal display, such maker can control at will the color purity of the liquid crystal cell and thus there is no limit on the employment of the liquid crystal cell with the low color purity. As a result, in such case, the inventors of the present invention found that the excellent color reproductivity can be obtained while maintaining the transmittance of the liquid crystal cell high if the color correction is applied by using the existing color converting technology in circuits on the television apparatus side, and thus came to complete the present invention.

It is an object of the present invention to provide a liquid crystal television apparatus a transmittance of liquid crystal cells of which is high and which is excellent in color reproductivity. It is another object of the present invention to realize such liquid crystal television apparatus at low cost.

According to an aspect of the present invention, there is provided a television apparatus having a liquid crystal display, including: a signal processing portion for reproducing a received video signal; a liquid crystal cell for displaying a video reproduced by the signal processing portion; a backlight light source arranged on a back surface side of the liquid crystal cell, for illuminating the liquid crystal cell; an optical member provided between the liquid crystal cell and the backlight light source, for guiding a light emitted from the backlight light source forward; a first driving circuit for driving the liquid crystal cell; and a second driving circuit for driving the backlight light source; wherein the liquid crystal cell is composed of cells that have a color purity in a range of 40% to 60%; and the signal processing portion has a color correcting circuit that improves a color reproductivity of the video displayed on the liquid crystal cell.

More concretely, in the present invention, the cells that have the color purity in a range of 40% to 60% are employed as the liquid crystal cell. As described above, if the color purity is in excess of 60%, the transmittance is lowered and thus the low luminance of the screen produces the problem. In contrast, if the color purity is lower than 40%, the high luminance of the screen can be secured but the color correction becomes difficult and thus the color reproductivity becomes worse. Therefore, the problem arises in practical use. Preferably the liquid crystal cell whose color purity is 45% to 55% should be employed.

According to the embodiment of the present invention, when the VGA (Video Graphics Array) liquid crystal cell is used as the liquid crystal cell, the transmittance is at least 10%. Also, when the XGA (Extended Graphics Array) liquid crystal cell is used as the liquid crystal cell, the transmittance is at least 7%. In both cases, the transmittance can be improved rather than the conventional art.

According to the embodiment of the present invention, the backlight light source is formed of a pair of U-shaped cold cathode fluorescent tubes. Accordingly, the number of the light sources can be reduced from three in the conventional art to two, for example. Also, since the U-shaped cold cathode fluorescent tubes are used, the number of the light sources can be reduced by half in contrast to the case the linear cold cathode fluorescent tubes are used. Therefore, the number of the circuits such as the inverter for driving the cold cathode fluorescent tube, etc., can be reduced.

According to the embodiment of the present invention, the optical member is constructed only by a diffusing sheet provided on a liquid crystal cell side and a diffusing plate provided on a backlight light source side. In the present invention, since the transmittance of the liquid crystal cell is increased, the prism sheet and the polarization reflecting sheet provided in the conventional art can be neglected. In particular, since the expensive polarization reflecting sheet can be omitted, a considerable reduction in cost can be achieved.

According to the embodiment of the present invention, the signal processing portion is composed of one IC, and a video decoder for executing a reproducing process of the video signal and a timing controller for controlling a timing to display the video on the liquid crystal cell together with the color correcting circuit are incorporated into the IC. Since these circuits are built in the one-chip IC, the number of elements on the wiring substrate can be reduced. Therefore, the substrate can be made compact and thus the assembling of the substrate into the liquid crystal television apparatus the can be facilitated.

According to the present invention, the liquid crystal television apparatus that has the high luminance and is excellent in the color reproductivity can be provided at low cost.

DETAILED DESCRIPTION OF THE PREFFERED EMBODIMENTS

Figure 1:
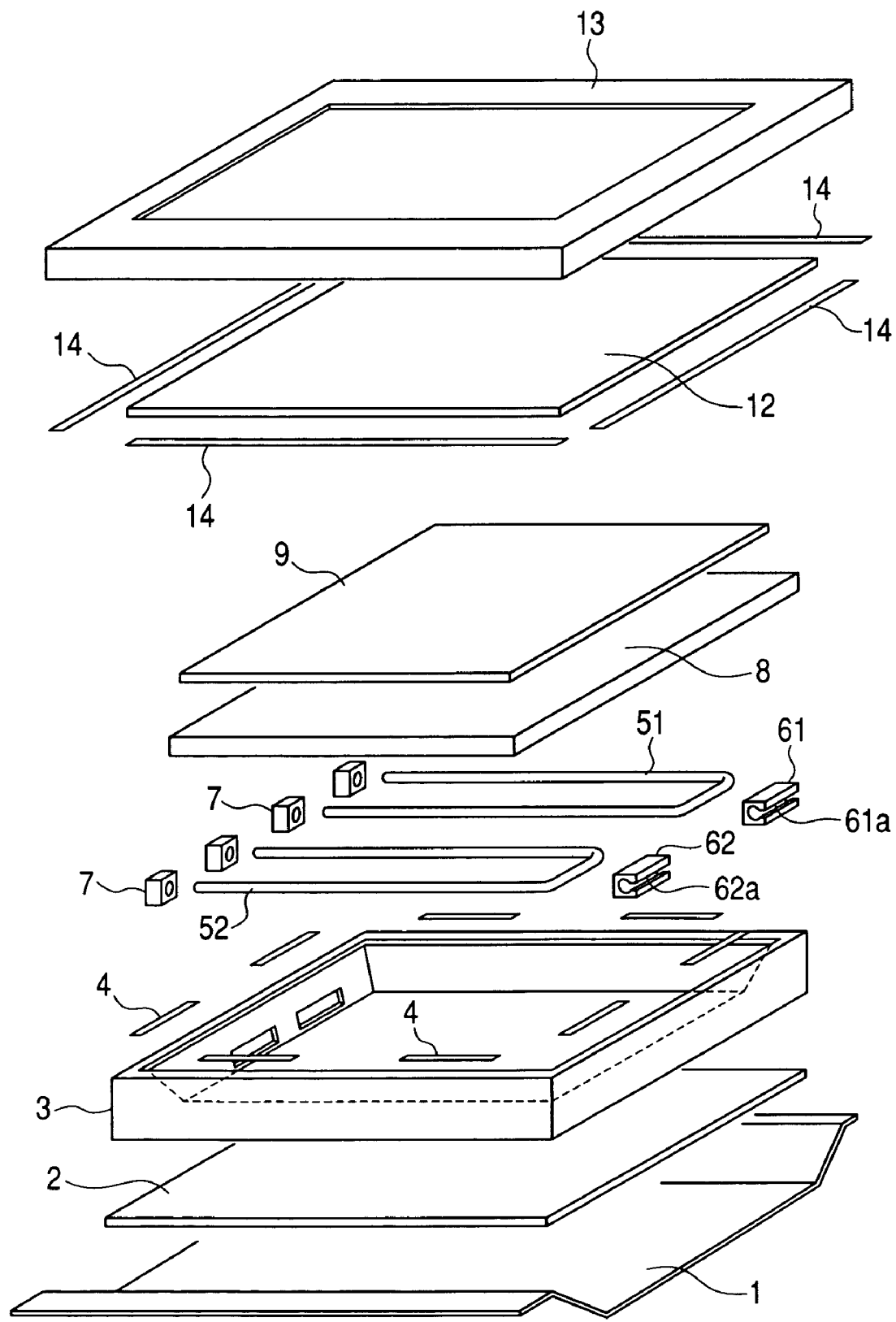
FIG. 1 is an exploded perspective view of a display unit in a liquid crystal television apparatus according to an embodiment of the present invention.
Figure 2:
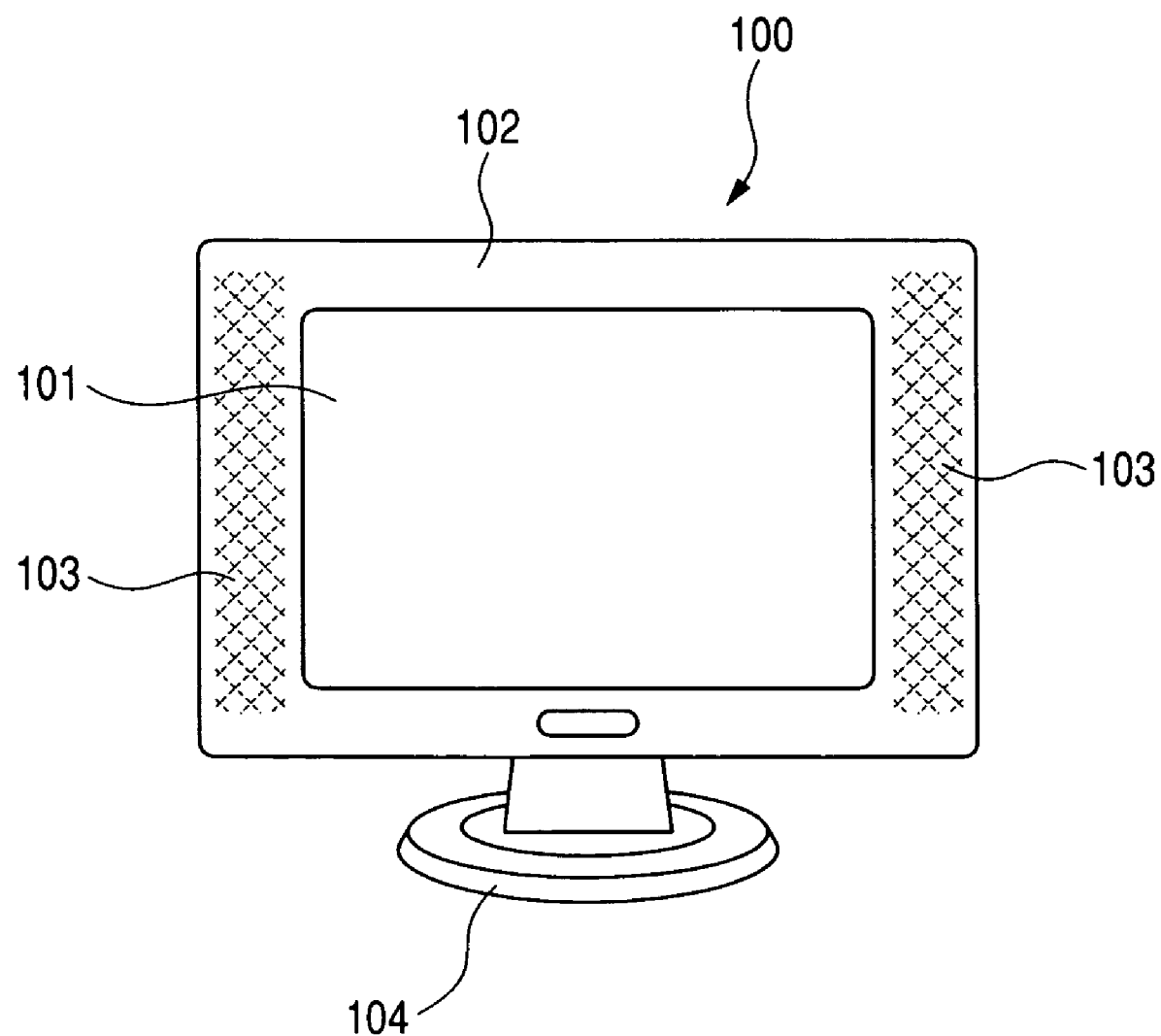
FIG. 2 is a front view of the liquid crystal television apparatus according to the embodiment of the present invention.

FIG. 1 is an exploded perspective view of a display unit in a liquid crystal television apparatus according to an embodiment of the present invention. FIG. 2 is a front view of the liquid crystal television apparatus according to the embodiment of the present invention.

Figure 5:
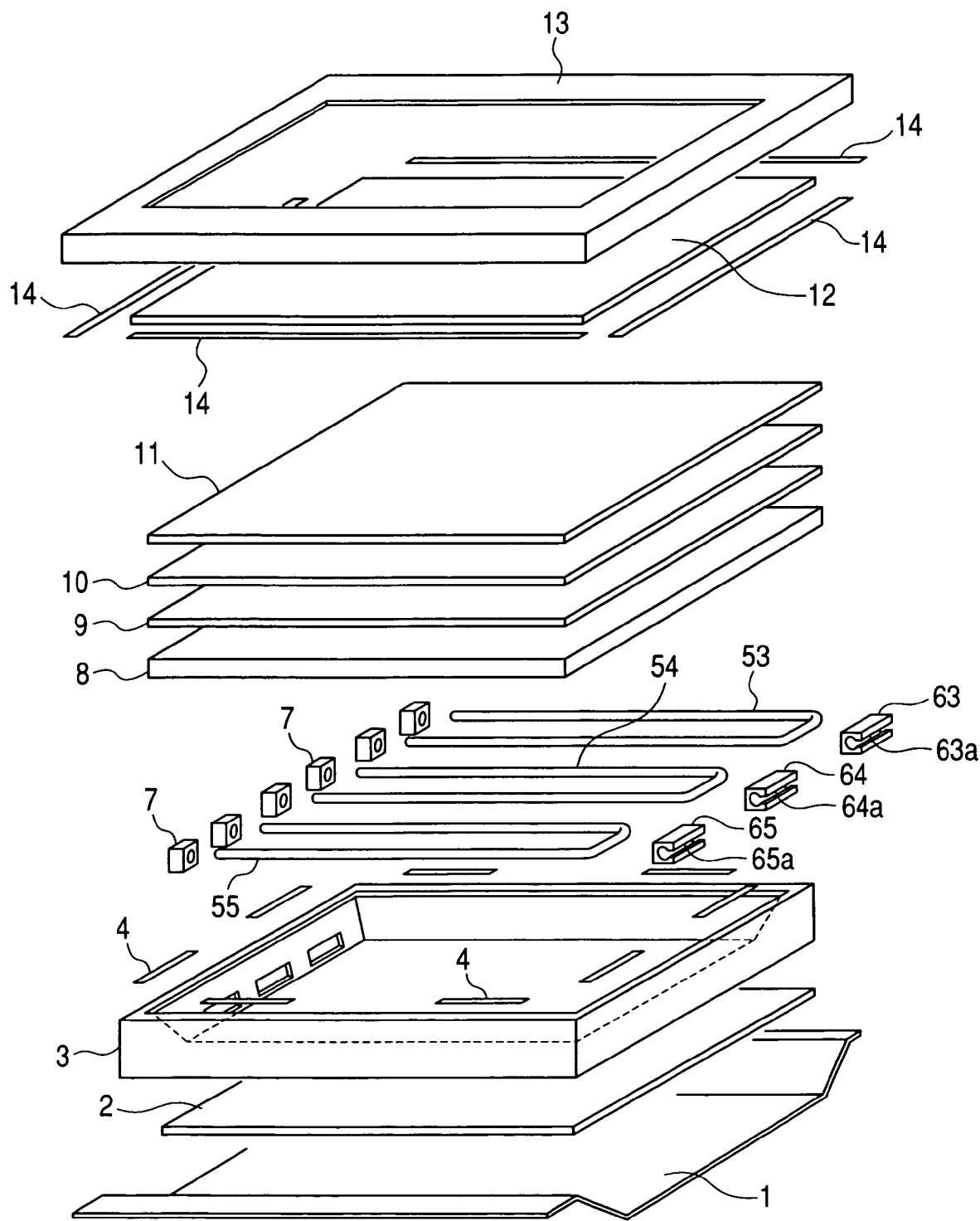
FIG. 5 is an exploded perspective view of a display unit in a conventional liquid crystal television apparatus.

In FIG. 1, the same reference symbols are affixed to the same parts as those in FIG. 5. Here, 1 is a rear frame that is formed of a metal plate. A wiring substrate (not shown) on which a signal processing IC is mounted is provided to the back side of the rear frame 1. Then, 2 is a reflecting sheet mounted on the rear frame 1 and is formed of a white synthetic resin plate. The reflecting sheet 2 acts to reflect lights emitted from backlight light sources 53 to 55 described later. Then, 3 is a reflection frame that is constructed by a metal or synthetic resin frame member, and its inner surface is coated in white to reflect the lights emitted from backlight light sources. Then, 4 is a rubber spacer 4 that serves as a buffer material when it is interposed between an upper edge of the reflection frame 3 and a liquid crystal cell 12 described later. Then, 51, 52 are a pair of cold cathode fluorescent tubes constituting backlight light sources, which are shaped into a U-shape respectively. Then, 61, 62 are holders that hold the cold cathode fluorescent tubes 51, 52 and are made of an elastic member such as silicon rubber. The holders 61, 62 have slits 61a, 62a into which the cold cathode fluorescent tubes 51, 52 are fitted respectively. Then, 7 is a socket into which each end portion of the cold cathode fluorescent tubes 51, 52 is inserted. The cold cathode fluorescent tubes 51, 52 and external circuits are electrically connected mutually via the sockets 7. In the above configuration, a difference from the configuration in FIG. 5 resides in that the number of the cold cathode fluorescent tubes 51, 52 is reduced from three to two and the number of the holders 61, 62 and the sockets 7 is reduced correspondingly.

Then, 8, 9 are optical members that guide the lights emitted from the cold cathode fluorescent tubes 51, 52 forward (upward in FIG. 1) and are constructed by a diffusing plate 8 and a diffusing sheet 9 for diffusing the light. Then, 12 is a liquid crystal cell that has a known structure including a pair of glass substrates, and a liquid crystal, transparent electrodes, color filters, etc., that are provided between the glass substrates. The detailed structure of the liquid crystal cell is disclosed in above JP-A-2002-323698 and JP-A-2003-5175. Also, the color filter is disclosed in above JP-A-11-248931. Then, 13 is a front frame that is made of metal and is formed like a frame in such a manner that the front frame 13 can cover an edge portion of the liquid crystal cell 12 while leaving a portion that serves as a display screen of the liquid crystal cell 12. Then, 14 is a masking tape that is pasted onto an edge portion of the surface of the liquid crystal cell 12. The masking tape 14 prevents the lights emitted from the cold cathode fluorescent tubes 51, 52 from leaking from peripheries of the liquid crystal cell. In the above configuration, a difference from the configuration in FIG. 5 resides in that the optical member is constructed only by two members of the diffusing plate 8 and the diffusing sheet 9, and the prism sheet 10 and the polarization reflecting sheet 11 in FIG. 5 are eliminated.

The display unit in FIG. 1 is incorporated into a liquid crystal television apparatus 100 shown in FIG. 2. In FIG. 2,

101 is a display screen, 102 is a front panel, 103 is a pair of speakers that are built in right and left sides of the front panel 102, and 104 is a stand for supporting a main body of the liquid crystal television apparatus 100. The display unit in FIG. 1 is fitted to the back side of the front panel 102. The liquid crystal television apparatus 100 displays the video on the display screen 101 and outputs the sound from the speakers 103 when a remote controller (not shown) is operated.

Figure 3:
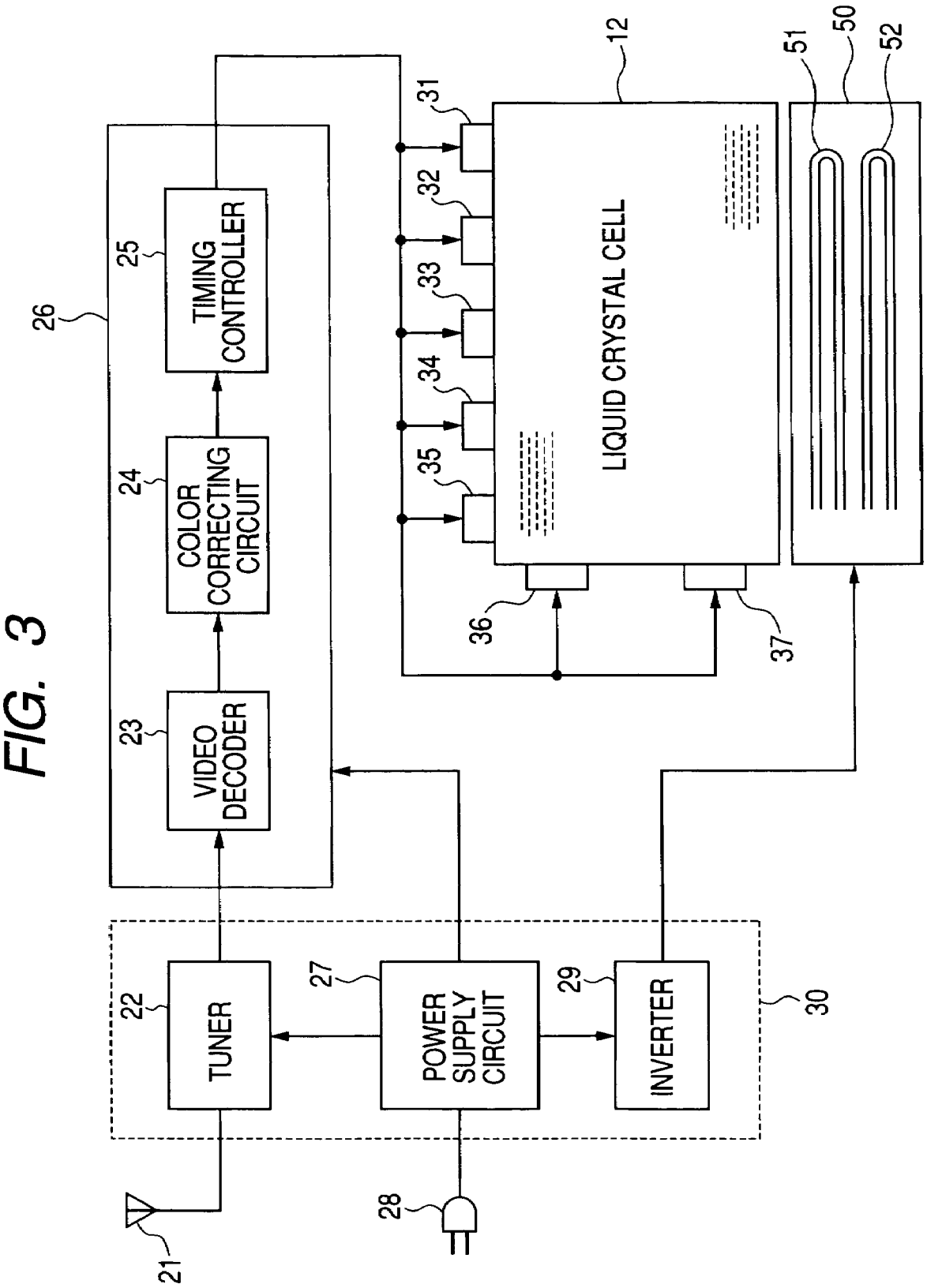
FIG. 3 is an electric block diagram of the liquid crystal television apparatus according to the embodiment of the present invention.

FIG. 3 is an electric block diagram of the liquid crystal television apparatus according to the embodiment of the present invention. Then, 21 is an antenna for receiving a broadcast radio wave, and 22 is a tuner for picking up a signal on the tuned channel from the radio wave received by the antenna 21. A video signal picked up by the tuner 22 is fed to a signal processing portion 26. The signal processing portion 26 is composed of one IC, and contains in the IC a video decoder 23 for executing the reproducing process of the video signal, a color correcting circuit 24 for applying the color correcting process to the reproduced video signal, and a timing controller 25 for controlling a timing at which the video is displayed on the liquid crystal cell 12. The known circuits are used as these circuits 23 to 25 as they are. Since the particular circuit configurations are well known for the skilled person in the art and they do not constitute the characterizing portion of the present invention, their detailed illustration will be omitted herein. As described above, the IC constituting the signal processing portion 26 is packaged onto the wiring substrate (not shown) that is fitted to the back side of the rear frame 1 in FIG. 1.

Source drivers 31 to 35 and gate drivers 36, 37 are attached to the liquid crystal cell 12. The source drivers 31 to 35 are circuits for driving the pixels (R, G, B) in the X direction (lateral direction) of the liquid crystal cell 12, and the gate drivers 36, 37 are circuits for driving the pixels in the Y direction (vertical direction) of the liquid crystal cell 12. These drivers are composed of one IC respectively and receive a control signal from the timing controller 25. Actually, the control signal is supplied to the ICs constituting the source drivers 31 to 35 via a relay wiring substrate (not shown). Also, the ICs constituting the gate drivers 36, 37 are provided onto the glass substrate of the liquid crystal cell 12, and wirings for transmitting the control signal from the timing controller 25 are provided onto the glass substrate. The source drivers 31 to 35 and the gate drivers 36, 37 function as a first driving circuit.

Then, 27 is a power supply circuit 27 that supplies necessary voltages to respective portions based on an AC 100 V voltage obtained via a power supply plug 28. Then, 29 is an inverter that supplies a voltage to drive the cold cathode fluorescent tubes 51, 52 constituting a backlight light portion 50. The power supply circuit 27 and the inverter 29 are also composed of the known circuit respectively. The inverter 29 functions as a second driving circuit. In this case, the power supply circuit 27 and the inverter 29 together with the tuner 22 are packaged onto a common wiring substrate 30 indicated by a broken line. This wiring substrate 30 is provided separately from the wiring substrate on which the signal processing portion 26 is disposed.

Incidentally, only the blocks that are associated with the present invention out of the blocks constituting the liquid crystal television apparatus 100 are illustrated in FIG. 3, and the illustration of other blocks (for example, the sound processing portion) is omitted. Also, the microcomputer constituting the control portion, the memory, etc., are omitted from this illustration.

Figure 4:
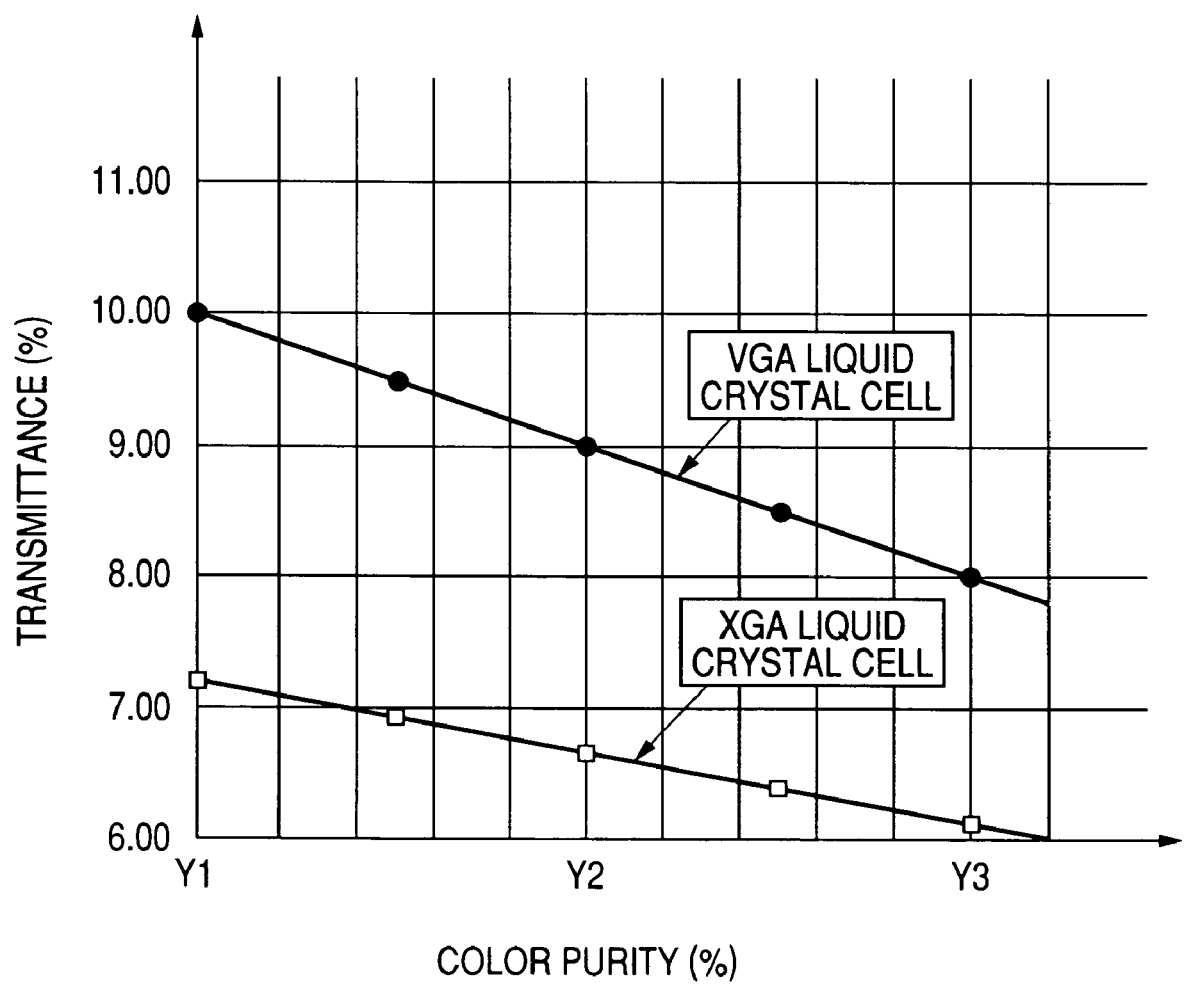
FIG. 4 is a graph showing a relationship between color purity and a transmittance.

In the present embodiment, in the above liquid crystal television apparatus 100, the cell whose color purity is 40% to 60% is employed as the liquid crystal cell 12. In the case where liquid crystal cell 12 is composed of the TN (Twisted Nematic) type VGA liquid crystal cell, the transmittance becomes about 10%, as can be seen from FIG. 4, when the color purity is 40% to 60% (Y1). In the case where liquid crystal cell 12 is composed of the XGA liquid crystal cell, the transmittance becomes about 7.2% when the color purity is 40% to 60% (Y1).

In comparison of this cell with the conventional cell whose color purity is 72%, in the conventional VGA liquid crystal cell, the luminance required for the backlight light source is 450/0.075=6000 cd when the transmittance is supposed as 7.5%, as described above, whereas, in the VGA liquid crystal cell in the present embodiment, the luminance required for the backlight light source becomes merely 450/0.10=4500 cd when the transmittance is supposed as 10%. Also, in the conventional XGA liquid crystal cell, the luminance required for the backlight light source is 450/0.060=7500 cd when the transmittance is supposed as 6.0%, as described above, whereas, in the XGA liquid crystal cell in the present embodiment, the luminance required for the backlight light source becomes merely 450/0.10=4500 cd when the transmittance is supposed as 7.2%.

Therefore, in the liquid crystal television apparatus 100 of the present embodiment, as shown in FIG. 1, only two cold cathode fluorescent tubes 51, 52 are sufficient for the backlight light source. Also, since the sufficient luminance can be assured on the screen of the liquid crystal cell 12 by two cold cathode fluorescent tubes 51, 52, the prism sheet 10 and the polarization reflecting sheet 11 shown in FIG. 5 can be eliminated. As a result, a reduction in cost can be attained by reducing the number of required parts.

In order to reduce the color purity from 72% in the conventional art to 40% to 60%, the film thickness of the coloring pigment in the color filter of the liquid crystal cell 12 may be thinned. Since the film thickness is reduced, the light emitted from the backlight easily pass through the color filter, and thus the transmittance can be improved. However, when the film thickness is reduced, the color density is lowered and the hue is changed, and thus the color reproductivity becomes worse. For this reason, in the liquid crystal television apparatus 100 of the present embodiment, the color correcting circuit 24 is incorporated into the signal processing circuit 26, as explained in FIG. 3, and then the color correction is executed by the color correcting circuit 24 to prevent reduction in the color reproductivity. The color correcting circuit 24 has a function capable of controlling freely respective colors independently. The color correction technology to implement such function is disclosed in Japanese Patent No. 3354158 and Japanese Patent No. 3344016, for example. Therefore, even when the liquid crystal cell 12 with the low color purity is employed, the video displayed on the liquid crystal cell 12 has desired hue, saturation, lightness by applying the above color correcting process to the video signal and the good color reproductivity can be secured.

In the present invention, the color purity of the liquid crystal cell 12 may be set to the same extent as the color purity of the liquid crystal cell employed in the liquid crystal monitor of the personal computer. Concretely, the color purity can take a value in a range of 40% to 60%. If the color purity is in excess of 60%, the transmittance is lowered and also reduction in the luminance of the screen becomes remarkable, and therefore the backlight must be intensified. In contrast, if the color purity is lower than 40%, the higher luminance of the screen can be maintained but it is difficult in fact to execute the color correction by the color correcting circuit 24. Thus, since the color reproductivity is considerably lowered, the problem is caused in practical use. As a result, it is preferable in fact that the color purity of the liquid crystal cell 12 should be set in a range of 45% to 55%.

In the present invention, various embodiments may be employed other than the foregoing embodiment. For example, the case where the TN (Twisted Nematic) type cell is used as the liquid crystal cell is taken as an example in the present embodiment, but other type cell such as the STN (Super Twisted Nematic) type cell may be used as the liquid crystal cell used in the present invention.

Also, in the above embodiment, the example in which the U-shaped cold cathode fluorescent tube is used as the backlight light source is taken, but an S-shaped cold cathode fluorescent tube, for example, may be used. In addition, the light source is not limited to the cold cathode fluorescent tube. For example, a white light emitting diode, or the like may be used as the light source.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A television apparatus having a liquid crystal display, comprising:
   a signal processing portion for reproducing a received video signal;
   a liquid crystal cell for displaying a video reproduced by the signal processing portion;
   a backlight light source arranged on a back surface side of the liquid crystal cell, for illuminating the liquid crystal cell;
   an optical member provided between the liquid crystal cell and the backlight light source, for guiding a light emitted from the backlight light source forward;
   a first driving circuit for driving the liquid crystal cell; and
   a second driving circuit for driving the backlight light source;
   wherein the liquid crystal cell is composed of cells that have a color purity in a range of 40% to 60%; and
   the signal processing portion has a color correcting circuit that improves a color reproductivity of the video displayed on the liquid crystal cell.

2. The television apparatus having a liquid crystal display according to claim 1, wherein the liquid crystal cell is formed of a VGA (Video Graphics Array) liquid crystal cell and has a transmittance of at least 10%.

3. The television apparatus having a liquid crystal display according to claim 1, wherein the liquid crystal cell is formed of an XGA (Extended Graphics Array) liquid crystal cell and has a transmittance of at least 7%.

4. The television apparatus having a liquid crystal display according to claim 1, wherein the backlight light source is formed of a pair of U-shaped cold cathode fluorescent tubes.

5. The television apparatus having a liquid crystal display according to claim 1, wherein the optical member is constructed only by a diffusing sheet provided on a liquid crystal cell side and a diffusing plate provided on a backlight light source side.

6. The television apparatus having a liquid crystal display according to claim 1, wherein the signal processing portion is composed of one IC, and a video decoder for executing a reproducing process of the video signal and a timing controller for controlling a timing to display the video on the liquid crystal cell together with the color correcting circuit are incorporated into the IC.

* * * * *